Patented Aug. 3, 1943

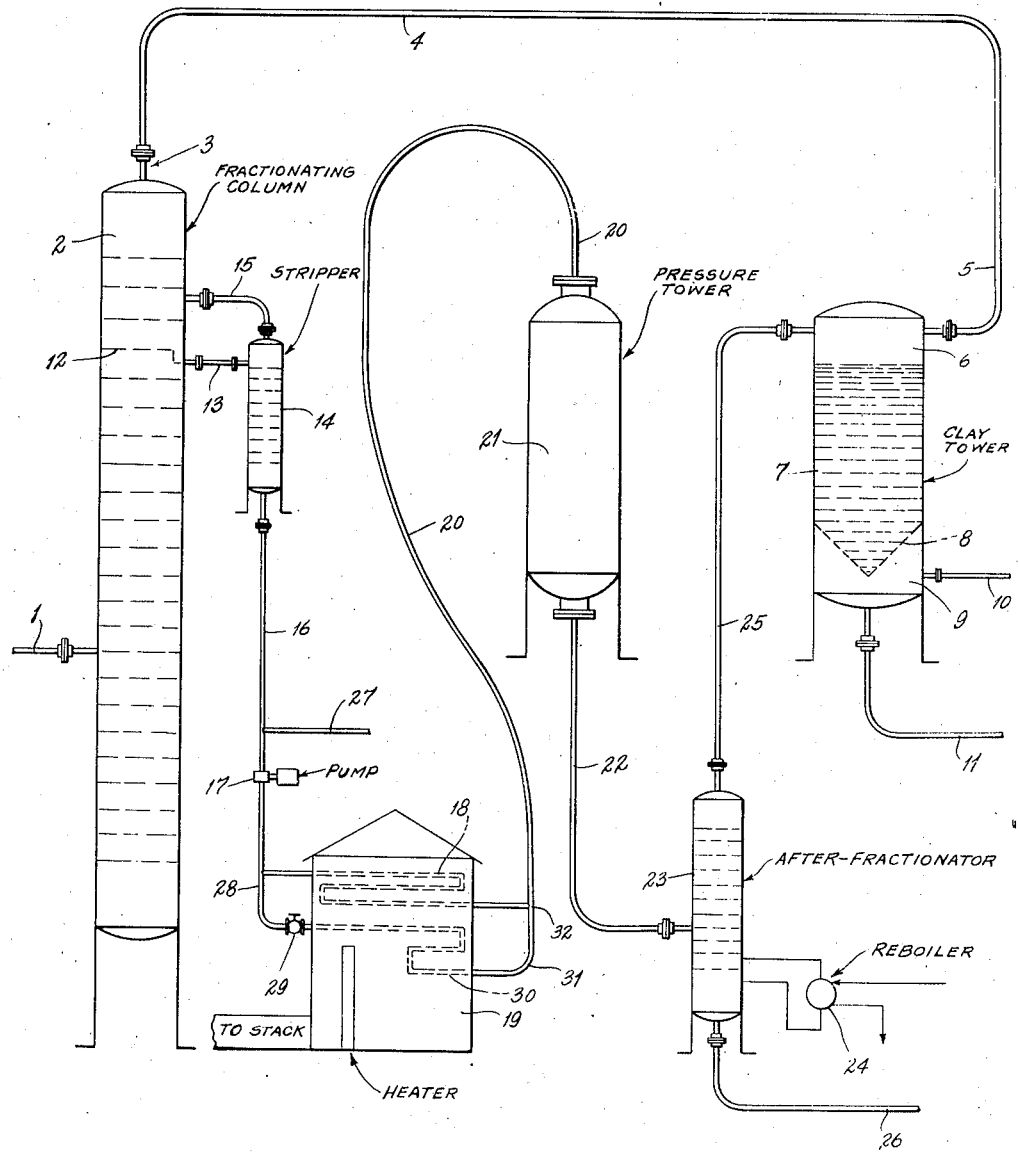

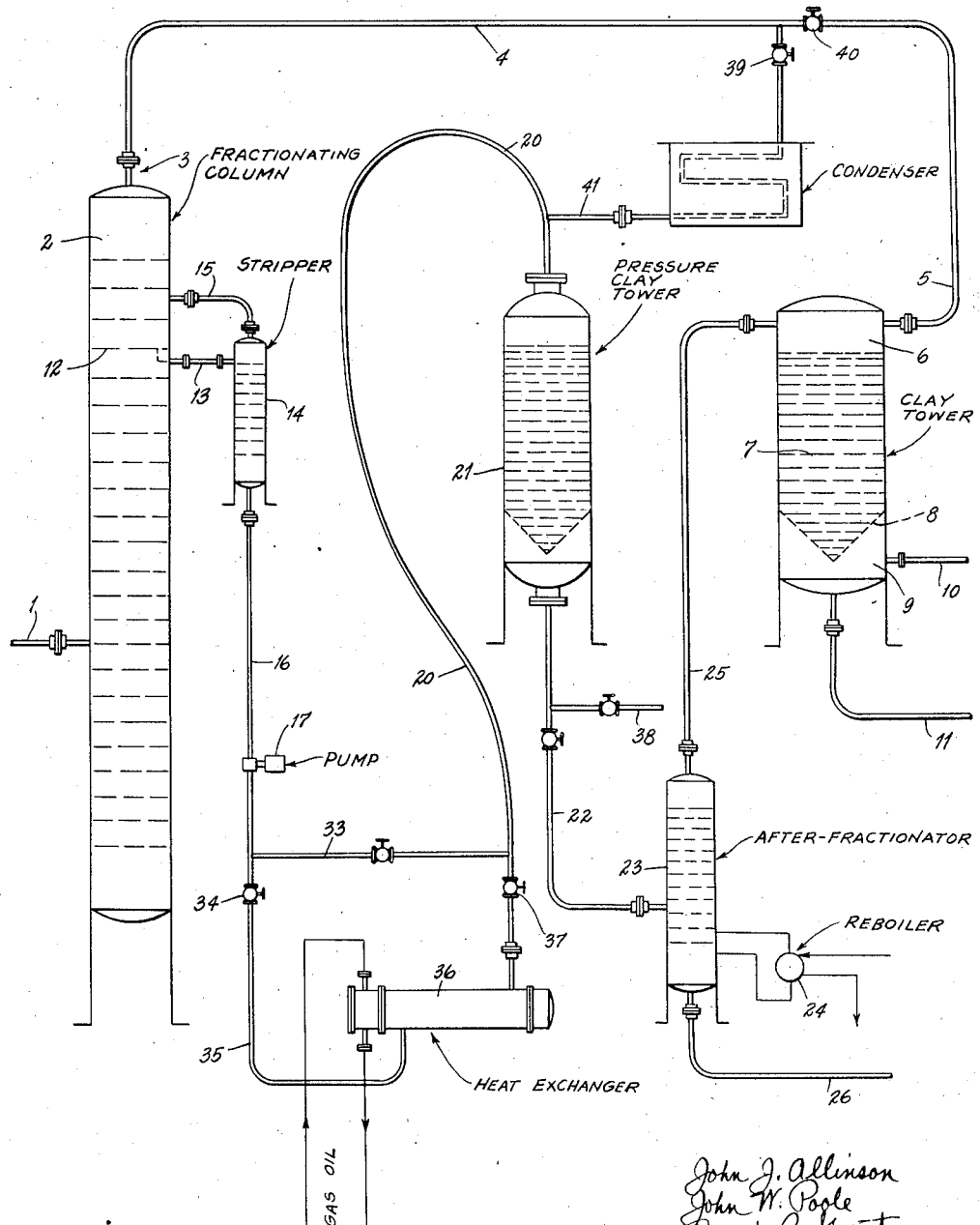

2,325,581

UNITED STATES PATENT OFFICE 2,325,581

METHOD FOR TREATING GASOLINE

John J. Allinson, John W. Poole, and Francis R. Grant, El Dorado, Ark., assignors to Lion Oil Refining Company, El Dorado, Ark., a corporation of Delaware Application April 4, 1940, Serial No. 327,790

9 Claims. (Cl. 196—96)

This invention relates to a method for refining petroleum motor fuels, and more specifically to improved methods for stabilizing gasoline through reduction of its gum forming constituents.

The present application is a continuation in part of our copending application Serial No. 322,034 filed March 8, 1940.

The principal objects of this invention are to provide alternative—and when dealing with certain types of material—more effective methods of accomplishing the fundamental invention disclosed in the above-mentioned application. More specifically, the objects of the present invention are to provide improved methods for removing gum-forming constituents from cracked petroleum distillates, including treatments with catalytic clay beds in such manner as to conserve the life of such beds. Other objects will be in part apparent, and in part pointed out hereinafter.

The invention accordingly comprises the steps and sequence of steps and methods of manipulation which will be exemplified in the methods hereinafter described, and the scope of the application of which will be indicated in the subsequent claims.

In the drawings, Fig. 1 is a schematic flow diagram of apparatus which may be employed in carrying out the method hereinafter described. Fig. 2 is a schematic diagram of apparatus for carrying out an alternative method. Similar reference numbers indicate corresponding parts.

The development of the cracking process immensely increased the proportion of gasoline constituents obtained in the refining of crude petroleum oils. It has been found, however, that petroleum distillates prepared by cracking are unstable and tend to form gum upon standing. Accordingly, some method is required for removing the gum so formed prior to sale of the gasoline products, or, alternatively, for the removal of the gum-forming constituents present in the cracked distillates. One of the most efficient methods for removing these gum-forming constituents is by the catalytic polymerization of these unstable compounds by means of a clay bed. The clay bed appears to act, catalytically, to polymerize the unstable constituents which tend to form gum without adversely affecting the remaining constituents of the cracked distillates. The polymers so produced have a boiling point above the gasoline boiling point range, and in consequence become liquid at the temperatures involved, and drain through the clay bed. This bed is generally supported upon a pervious screen or other pervious support, so that the polymers may be drained from the clay bed to prolong its life. Even so, however, the clay bed has heretofore been capable of employment only for a limited number of barrels of gasoline, and has eventually become so contaminated that it has had to be discarded. Methods have been devised for improving the over-all life of the clay bed by counter-current methods of extraction, but even these have not lengthened the life of the bed to the desired extent. The treatment of the cracked distillate remains an expensive procedure, the cost of which must inevitably be added to the price of the gasoline.

According to the present invention raw cracked gasoline, that is, petroleum distillates containing constituents boiling between approximately 32° F. and 450° F. under atmospheric pressure and which form a commercial gasoline having a boiling range of approximately 100° F. to 400° F., is divided into at least two portions, one of higher boiling range and the other of lower boiling range, which are separately treated. As is hereinafter more particularly described, the life of the clay beds is enormously increased in this way. That is, the number of barrels of gasoline having a commercially satisfactory low gum-forming content which may be produced from a given quantity of clay is materially increased. For example, if a cracked gasoline having a boiling range of approximately 100° F. to 400° F. is divided into two fractions, the more volatile having an end point of preferably around 200° F., and the second consisting of the higher boiling material, preferably having a boiling range of approximately 200° F. to 400° F., more than ten times the quantity of the low boiling fraction can be stabilized to less than .5 milligrams of gum by treatment with a given quantity of clay than will be possible if the entire gasoline fraction is treated in undivided condition.

Furthermore, it has been found that a greatly increased quantity of the heavier fraction can be processed with clay which has become so spent as to have heretofore been considered valueless, provided the reduction in gum content is not required to exceed approximately 75%. Such a reduction, although considerable, is of course not sufficient to render the material suitable for incorporation into commercial motor fuels. Furthermore, gum reductions considerably in excess of 50% can be secured as hereinafter more fully described by heat treating alone at elevated temperatures in the absence of clay.

In the discussion hereinafter, involving separation of raw cracked gasoline into two fractions of respectively greater and lesser volatility, these fractions will be referred to, respectively, as fraction No. 1 and fraction No. 2. Fraction No. 1, as in our previous application, is subjected to a vapor phase treatment only, for reduction of the gum content thereof. Fraction No. 2 on the other hand is subjected to a preliminary partial de-gumming treatment in which those materials most prone to contaminate a vapor phase clay bed and render said bed incapable of reducing the gum content of gasoline to commercial limits are substantially removed; said preliminary treatment, on the other hand, usually being insufficient to reduce the material treated to commercial specifications.

More commonly than otherwise a fraction No. 1 will comprise essentially all of those constituents boiling up to about 200° F., and a fraction No. 2 will comprise essentially all of those substances, capable of being incorporated in gasoline, which boil from 200° F. up; the highest boiling constituents of a No. 2 fraction will, at normal atmospheric pressures, boil somewhere between 400° F. and 450° F.

Our present invention differs from that disclosed in our previous application principally in the nature of the preliminary treatment of fraction No. 2. In that application both preliminary and final treatments were given in the vapor phase. In our present invention the preliminary treatment is given in the liquid phase, and at temperatures which are usually more elevated than those employed previously: Fraction No. 2 is heated to temperatures between approximately 450° F. and a point in excess of 600° F. In one form of the present invention no catalytic material such as clay is employed, and the temperature to which the fraction is elevated should, in general, exceed 550° F. In order to maintain this material in the liquid state, pressures in excess of the vapor pressure of fraction No. 2 must be employed so that the greater concentration of polymerizable materials, which will exist in a liquid phase over that possible in a more dispersed gaseous or vapor phase, will tend to facilitate the formation of polymers. In consequence thereof, one advantage of our invention will immediately become self-evident to those skilled in the art. Since only the higher boiling portion of the raw cracked gasoline is subjected to this type of treatment, the pressures necessary for maintenance of liquid phase conditions will be considerably less than would be the case if the entire gasoline cut were thus treated. In those processes known to the art in which polymerization in the liquid phase, either with or without catalyst, is the sole method by which gum is reduced, extremely high pressures are necessary; being frequently in excess of 1000 pounds per square inch. In that form of the present invention wherein clay is used in the preliminary treatment, it is rarely necessary to employ pressures in excess of 200 pounds per square inch, although it will be obvious to one skilled in the art that in case an advantage is found to result from changing the temperature which divides fractions Nos. 1 and 2, pressures must be used in keeping with the dividing point temperature and the volatility of fraction No. 2. For reasons hereinafter more fully disclosed, essentially all of the substances incorporated in cracked gasoline may be profitably subjected to both the preliminary and final treatments if the temperature employed for cracking is extremely high.

In general, 200° F. appears to be the most suitable dividing point between two fractions, provided temperatures in excess of approximately 925° F. have not been employed for the production of the cracked gasoline. On the other hand, from 925° F. upward we have discovered that the most desirable dividing temperature between fractions Nos. 1 and 2 tends to become steadily lower. In fact, certain vapor phase cracked gasoline produced at unusually high temperatures can be profitably processed as a single fraction throughout, the entire gasoline cut receiving both the liquid phase treatment under pressure disclosed herein and the subsequent vapor phase treatment. To secure the utmost benefit from this invention, it is necessary to include more and more material in fraction No. 2 as the temperature employed for cracking increases. Apparently, if temperatures of approximately 1000° F. are employed for cracking a paraffinic 36 gravity gas oil, a dividing point of not substantially in excess of 150° F. should separate fractions Nos. 1 and 2. On the other hand, when cracking more volatile materials at 1000° F. this dividing point seems to be desirably higher. Furthermore, the source of a charging stock appears to have an influence on the best temperature for dividing the fraction. The exact dividing point which will be productive of the lowest catalyst consumption is easily determined for each separate charging stock and condition by making trial runs at slightly different dividing points. The difference in the length of two runs for example will give a clear indication of the relative advantages of the respective division temperatures and will indicate whether or not another run is necessary to determine the most advantageous point for division.

In that form of the present invention wherein a catalyst is employed to accelerate the production of polymers, lower temperatures are required than when a catalyst is not employed. Nevertheless, the higher the temperature up to approximately 600° F., the more rapid and effective will this pre-treatment be under a given set of conditions. However, if the temperature of treatment is increased, the life of the catalyst in this liquid phase treatment decreases. At temperatures in the neighborhood of 450° F. the catalyst, after once having reached a certain equilibrium in a relatively short time after the liquid phase tower has been charged with fresh or used clay, appears to have an almost indefinite life. This equilibrium catalytic power is sufficient to result in a very substantial reduction in the gum content of the material treated, and furthermore to remove those materials which, if removed in the final vapor phase bed, most drastically shorten its life.

In many cases this equilibrium power appears to be somewhat higher than the somewhat analogous equilibrium power of the preliminary vapor phase treating bed, disclosed in our previous application, tending to deliver for the final treatment material which will form less polymer of a nature more easily removable from the bed. This advantage is distinct for gasolines produced at cracking temperatures above 925° F.

If temperatures of close to 600° F. are employed for the liquid phase treatment using a catalyst, the material first produced thereby will be radically lower in gum content than will material produced at 450° F. However, there either is no equilibrium potency to which the catalyst will fall, or this equilibrium potency is too low to sustain the necessary reactions so that poorer and poorer material is delivered for vapor phase treatment and results finally in faster deterioration of the vapor phase bed.

This phenomenon is also evident at temperatures between 500° F. and 550° F., although the poisoning of the liquid phase catalyst takes place much more slowly at these reduced temperatures.

The above facts, for purposes of the present invention, may be summed up as follows:

At temperatures not greatly in excess of 450° F. the catalyst life at a potency inadequate for the production of completely de-gummed gasoline but sufficient for substantial de-gumming thereof is practically indefinite. On the other hand, as temperatures increase there is a tendency toward slow poisoning of the catalyst, a phenomenon which becomes more marked as temperatures approach 600° F. At temperatures somewhere in excess of 600° F. the use of clay as a catalyst for polymerization becomes unsatisfactory, apparently due to the fact that the material also serves as a catalyst for disintegration.

If, when using clay, more elevated temperatures are employed, treating will, as noted previously, be for a time considerably more effective. In fact, by regulation of temperatures between 400° F. and 600° F., great variation in clay life can be secured. Since there is apparently no method for indefinitely prolonging the life of the vapor phase bed, and since spent clay from this bed is nearly as effective for a liquid phase catalyst as "fresh" clay after comparatively short use, a constant source of replenishment for liquid phase catalyst is available at no more cost than that of handling. It is interesting to note that in certain instances this used clay has been found to actually improve in catalytic power for several days after having been transferred from one bed to the other.

In that form of the present invention where no clay is used, the question of time allowed for reaction becomes important to a far greater extent than when clay is used. In the absence of a catalyst, regardless of the temperature employed, a certain time is necessary to effect polymerization. At first the rate may be extremely slow. In fact, we have noted instances where little or no polymerization has taken place after holding the material for one hour at 550° F. and 400 pounds per square inch pressure. Thereafter, the rate of polymerization may suddenly increase and a very considerable gum reduction be accomplished in a half hour. At other times reaction may start almost immediately. With no apparent difference in conditions, comparable results have been attained in 20-minute and 90-minute periods, when in the case of the longer period no appreciable polymerization had occurred within the first hour. Obviously, such erratic performance is incompatible with the requirements of control of commercial operations. Furthermore, if excessive time is required, larger and correspondingly more costly reaction vessels will be required. However, we have discovered that this erratic performance may be eliminated and two separate methods have been devised by us to insure prompt initiation of the desired reactions. We have discovered that if as little as 5% of the material to be treated, or, in fact, an equivalent amount of any other petroleum substance, is raised to a temperature of between 800° F. and 900° F. and thereafter injected into the material to be treated, the desired reaction will start immediately. We have also discovered that the injection of as little as 2% of pressure tar will serve a similar purpose; 5% of pressure tar appears to be as effective as any greater quantity.

When no catalyst is used, increase in temperature results in greater gum removal, better feed to the vapor phase clay bed and increased life thereof. As the temperatures are increased, greater pressures are needed to assure maintenance of the substance being treated in a liquid state.

In general, treating without catalyst requires temperatures greater than does treating with catalyst, in order to obtain comparable results.

In the accompanying drawings Fig. 1 depicts a desirable form of apparatus for carrying out the present improved methods, the operation of the invention as portrayed in Fig. 1 being as follows:

Through vapor line 1 vapors from a conventional cracking furnace (not shown) enter fractionating column 2, passing upwardly therethrough. This column is refluxed by any of the conventional means well known to the art. Functioning of this column denudes the vapors issuing from the top thereof, at point 3, of their higher boiling constituents. Reflux columns are conventional and their operation is generally known, so that the operation thereof will not be further discussed. According to one form of the present invention, substantially all of the petroleum substances boiling at about 200° F. or higher are thus separated from the more volatile vapors, which latter pass through conduits 4 and 5, and into clay tower 6, which contains comparatively fresh catalytic clay. From there, the low boiling vapors together with the vapors of the partially refined high boilers, as will be described subsequently, pass downwardly through the clay bed 7, which is supported by a pervious plate or support 8, of any suitable design to permit the clay to be retained thereon, and yet permit passage therethrough of liquids as they arrive at this point. Vapors, and polymers formed within the clay bed are separated in chamber 9 after passing support 8. The vapors issue through conduit 10, which leads to equipment suitable for effecting any subsequent desired processing (not shown). In general such equipment will comprise an after-fractionator, a condenser and/or an after-cooler. The liquid polymers issuing from chamber 9, pass through conduit 11, and may be disposed of in any suitable manner.

From tray 12 in the fractionating column, liquid petroleum substances having boiling-point characteristics such as are typical of the higher boiling portions of commercial motor fuels, are withdrawn through conduit 13, and stripper 14, which may be of conventional design, and the function of which is to substantially remove remaining portions of low boiling hydrocarbons, such as those which pass from the fractionator through vapor lines 4 and 5 to clay tower 7. These lighter materials pass through conduit 15, back to fractionator 2. The heavier portions, now substantially freed of the lighter boiling constituents, pass from stripper 14 through conduit 16 to pump 17, thence through heater 18 wherein the material is elevated to the desired temperature by means of heat supplied by furnace 19. From the heater the material now elevated to the desired temperature passes through conduit 20 to pressure tower 21 which is of capacity sufficient to provide the necessary time for polymerization. Both the treated material and the polymers will issue from tower 21 through conduit 22 to after-fractionator 23 wherein by virtue of the functions of this type of equipment which are well known to the art, the material will be fractionated into liquid polymers and gasoline constituents in the vapor phase, such heat as is necessary to perform these functions being supplied by a conventional reboiler 24. From 23 the gasoline constituents in the vapor phase pass through conduit 25 to clay tower 6 wherein they become commingled with the vapors of fraction No. 1 and pass concomitantly therewith downwardly through clay bed 7, the treated portions to issue through line 10 and the polymers through conduit 11. From after-fractionator 23 liquid polymers formed in pressure tower 21 will be withdrawn through conduit 26 and thereafter disposed of in any appropriate manner.

In the preferred manner of carrying out this form of our invention a quantity of "pressure tar" equal to 2% to 5% by volume of the material treated is injected through conduit 27 into the suction of pump 17 which will act as a mixing device therefor. This pressure tar may be that produced by the same cracking procedure productive of the material treated. By virtue of the injection of said pressure tar, polymerization of gum-forming materials begins as soon as the material approaches the desired temperature by virtue of its passage through heating coil 18.

An alternative method of inducing and assuring polymerization may be practiced by passing approximately 5% of fraction No. 2—after having passed through pump 17—through conduit 28, regulating valve 29 and heating coil 30 wherein the temperature of said 5% becomes elevated to a temperature between 800° F. and 900° F. From heating coil 30 the material passes through conduit 31 to point 32 where it rejoins the main stream of fraction No. 2.

The above description is of that form of our invention in which no catalyst is used to assist in the formation of polymers. In that form of our invention wherein clay is used, and the action of temperature and pressure is assisted by catalysts, the procedure will be substantially similar to the foregoing, except that the pressure tower 21 will be converted to a pressure clay tower by substantially filling it with fresh clay, or preferably clay formerly employed in tower 6 which, by virtue of use, has become so reduced in catalytic power as to no longer be capable of producing gasoline of commercial gum requirements. Referring now to Fig. 2, the material to be treated passes downwardly through the clay bed in tower 21 where such material as is polymerizable at the conditions therein existing will form polymers. Frequently little or no heating is required for operation in this manner. In certain high pressure types of cracking, fraction No. 2 will issue from stripper 14 as shown in Fig. 2 through line 16 and pump 17 at temperatures between 450° F. and 475° F. In those frequent cases wherein such temperatures are sufficient, the material will proceed from pump 17 through by-pass 33 to line 20, thence through tower 21, conduit 22, after-fractionator 23 and so on in the manner already described in connection with Fig. 1.

If, on the other hand, slightly higher temperatures are desired, or if by virtue of the materials to be treated having been produced by cracking methods employing lower pressures, fraction No. 2 issues from stripper 14 at substantially lower temperatures, auxiliary heating equipment should be employed. The material to be treated will then pass from pump 17 through valve 34, conduit 35, heat exchanger 36, valve 37 located in line 20, and thence as already hereinbefore described. Heat exchanger 36 may advantageously be of a floating head tubular type to which heat is supplied by the circulation of hot gas oil, which in general is present in excess quantities at temperatures of 600° F. or greater at commercial cracking units.

In addition to the variations already disclosed, we have developed a modification of the invention which is particularly useful in special instances for the handling of certain stocks. Certain sulphur-bearing gas oils when cracked lend themselves to polymerization with comparative ease. For example, we have discovered that a No. 2 fraction of cracked gasoline produced from Schuler crude can be successfully polymerized in the liquid state by passage through clay at lower temperatures than is possible with material from other sources. When such a fraction No. 2 is produced by a fractionator operating at elevated pressure, such as 125 pounds per square inch, and in consequence issues therefrom at temperatures of from 450° F. to 475° F., passage as liquid at this temperature through a clay bed will satisfactorily reduce the gum content to commercial specifications with an excellent clay life. Yields of 8,000 barrels per ton of fresh clay have regularly been secured, and in some instances very much superior yields have been secured.

For the practice of the above modification of our invention, it is necessary only to remove the materials treated in pressure clay tower 21, shown on Fig. 2, immediately after issuing from said tower 21 through conduit 38 to conventional and suitable apparatus for the separation of polymers and finished gasoline (not shown). In practice, conduits 38 and 10 may be joined and the treated materials issuing from the two towers subjected to a common after-treatment for the removal of polymers.

We have also discovered that both the No. 2 fraction of cracked gasoline produced from Schuler crude and the entire gasoline fraction comprising both fractions Nos. 1 and 2 from Schuler crude may be successively treated at even lower temperatures than 450° F. in the liquid phase alone. In plants where the cracking procedure is carried out at lower pressures, in consequence of which the gasoline fractions would issue from a fractionator at temperatures lower than 450° F., the value of this variation is readily apparent. Moreover, the advantages of separating the cracked gasoline into fractions Nos. 1 and 2 is decreased, since the pressure necessary to maintain the unseparated cracked gasoline would be lower. Such an undivided raw cracked gasoline, clay-treated in the liquid phase at 350° F., with the addition of very moderate quantities of anti-oxidant, produces a motor fuel meeting commercial gum requirements.

In practicing the aforementioned modification of the invention, the valve 40 in Fig. 2 may be closed, and valve 39 opened, passing the more volatile fraction No. 1 through a condenser, and then through pipe 41 and pipe 20, to the pressure clay tower. In this way, both fractions Nos. 1 and 2 will pass through the pressure clay tower 21, and then if desired through after-fractionator 23 and clay tower 7.

In the foregoing description, it has been suggested that the fraction No. 2 should be fed into clay tower 7, together with fraction No. 1, when a treatment with a relatively active clay catalyst is employed. Although this procedure is, under most circumstances, preferable from the viewpoint of economy, it is of course clear that separate clay towers might be employed, and the fractions Nos. 1 and 2 separately treated in the vapor phase, rather than together.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

What is claimed is:

1. The method of treating cracked gasoline which comprises dividing the raw cracked gasoline into a first fraction of relatively high volatility and a second fraction of relatively low volatility, clay-treating said second fraction in liquid phase, vaporizing the unpolymerized portion of said second fraction, combining the resulting vapors with the vapors of said first fraction, and clay-treating said combined fractions in the vapor phase.

2. The method of polymerizing substances contained in cracked gasoline to reduce the gum content thereof, which comprises dividing said cracked gasoline into a first fraction of relatively high volatility and a second fraction of relatively low volatility, treating said second fraction under conditions promoting polymerization of gum-forming constituents in liquid phase at a temperature between 440° F. and 750° F., vaporizing the unpolymerized portion of said fraction, combining the resulting vapors with the vapors of said first fraction and passing said combined vapors through a bed of catalytic clay.

3. The method of treating cracked gasoline which comprises separating said gasoline into a first fraction of relatively high volatility and a second fraction of relatively low volatility, separately clay-treating said second fraction in the liquid phase at a temperature not substantially in excess of 475° F. and at a pressure not substantially in excess of 500 pounds per square inch, removing the resulting polymers from said second fraction and vaporizing the unpolymerized constituents thereof, combining the resulting vapors with the vapors of said first fraction and clay-treating said combined vapors.

4. The method of treating cracked gasoline which comprises division thereof into a fraction No. 1 comprising relatively low-boiling constituents and a fraction No. 2 comprising relatively high-boiling constituents, clay-treating fraction No. 2 in the liquid phase at a temperature between 350° F. and 600° F., thereafter evaporating the unpolymerized constituents of fraction No. 2, combining the resulting vapors with the vapors of fraction No. 1 and simultaneously clay-treating the vapors of both fractions, and separating the resulting polymers from the unpolymerized portions of the combined fractions.

5. The method of treating cracked gasoline which comprises separating said cracked gasoline into a first fraction of relatively high volatility and a second fraction of relatively low volatility, passing said second fraction in liquid phase at a pressure not substantially in excess of 500 pounds per square inch and at a temperature not substantially in excess of 475° F. through a bed of relatively spent catalytic clay, separating and removing therefrom the resulting polymers, vaporizing the unpolymerized portions of said second fraction and commingling said vapors with said first fraction, and passing said commingled vapors substantially free from polymers through a second bed of catalytic clay, and thereafter separating polymers from the gasoline.

6. The method of treating cracked gasoline which comprises separating said gasoline into a first fraction of relatively high volatility and a second fraction of relatively low volatility, separately treating said second fraction in liquid phase under conditions which promote polymerization of gum-forming constituents, vaporizing the unpolymerized portions of said fraction, commingling said vapors with the vapors of said first fraction, and polymerizing gum-forming constituents in said combined vapors by passing said vapors through a clay bed.

7. The method of producing cracked gasoline of low gum content which comprises passing the vapors evolved from petroleum substances which have been subjected to cracking conditions through a fractionating means, therein fractionating said vapors into a highly volatile gasoline fraction and into a fraction of comparatively low volatility containing substantially all the remaining substances suitable for inclusion in gasoline and also into other fractions; removing said fraction of comparatively low volatility, passing it in the liquid phase through a bed of catalytic clay, removing the polymers from the unpolymerized portions of said fraction, removing said highly volatile gasoline fraction from the fractionating means, commingling the vapors thereof with the polymer-freed vapors of the fraction of comparatively low volatility, simultaneously clay-treating the vapors of both fractions and thereafter separating polymerized from unpolymerized materials.

8. The method of producing cracked gasoline of low gum content which comprises passing the vapors evolved from petroleum substances which have been subjected to cracking conditions through a fractionating means; therein fractionating said vapors into a highly volatile gasoline fraction and into a fraction of comparatively low volatility containing substantially all the remaining substances suitable for inclusion in gasoline and also into other fractions; removing said fraction of comparatively low volatility, passing it in the liquid phase through a bed of catalytic clay previously employed as a catalyst for vapor phase treating, removing the polymers from the unpolymerized portions of said fraction, removing said highly volatile gasoline fraction from the fractionating means, commingling the vapors thereof with the polymer-freed vapors of the fraction of comparatively low volatility, simultaneously clay-treating the vapors of both fractions and thereafter separating polymerized from unpolymerized materials.

9. The method of treating cracked gasoline, which comprises dividing the raw cracked gasoline into two fractions of high and low volatility, separating and maintaining the fraction of low volatility in liquid phase under conditions which will induce polymerization of at least a portion of the gum-forming constituents contained therein, separating and removing the resulting polymers, vaporizing the unpolymerized portions of said fraction of low volatility and mixing the vapors thereof with the vapors of said fraction of high volatility, and clay-treating the combined fractions in the vapor phase.

JOHN J. ALLINSON.
JOHN W. POOLE.
FRANCIS R. GRANT.